(12) United States Patent
Adachi

(10) Patent No.: US 6,362,413 B1
(45) Date of Patent: Mar. 26, 2002

(54) AUTOMATIC ACCOMPANIMENT APPARATUS DISPLAYING THE NUMBER OF BARS IN AN INSERT PATTERN

(75) Inventor: Yoshihisa Adachi, Hamamatsu (JP)

(73) Assignee: Kabushiki Kaisha Kawai Gakki Seisakusho, Hamamatsu (JP)

( * ) Notice: Subject to any disclaimer, the term of this patent is extended or adjusted under 35 U.S.C. 154(b) by 0 days.

(21) Appl. No.: 09/559,798

(22) Filed: Apr. 27, 2000

(30) Foreign Application Priority Data

Apr. 30, 1999 (JP) .......................................... 11-123677

(51) Int. Cl.⁷ ............................ G09B 15/04; G10H 1/42
(52) U.S. Cl. .................... 84/667; 84/477 R; 84/DIG. 12
(58) Field of Search ................... 84/609–614, 634–638, 84/649–652, 666–669, 470 R, 477 R, 478, DIG. 12, DIG. 22

(56) References Cited

U.S. PATENT DOCUMENTS 4,256,005 A * 3/1981 Mishima ................. 84/DIG. 12
5,478,967 A * 12/1995 Saito et al. .................... 84/612
5,502,275 A * 3/1996 Kondo et al. .................. 84/635
5,596,160 A * 1/1997 Aoki ......................... 84/611 X

* cited by examiner

Primary Examiner—Stanley J. Witkowski
(74) Attorney, Agent, or Firm—Christie, Parker & Hale, LLP

(57) ABSTRACT

An apparatus has an insert pattern play instruction unit (54) for selecting a desired insert pattern and instructing to play the selected pattern, and a bar count display unit (57) for displaying the number of bars of the selected insert pattern upon playing the selected insert pattern. Since the number of bars of a desired insert pattern is displayed at the beginning of the play of the insert pattern, even when the player does not remember the numbers of bars of insert patterns, which are different in units of rhythm styles, he or she can recognize the end timing of that insert pattern, and can easily enjoy a manual play in accordance with that pattern.

15 Claims, 4 Drawing Sheets

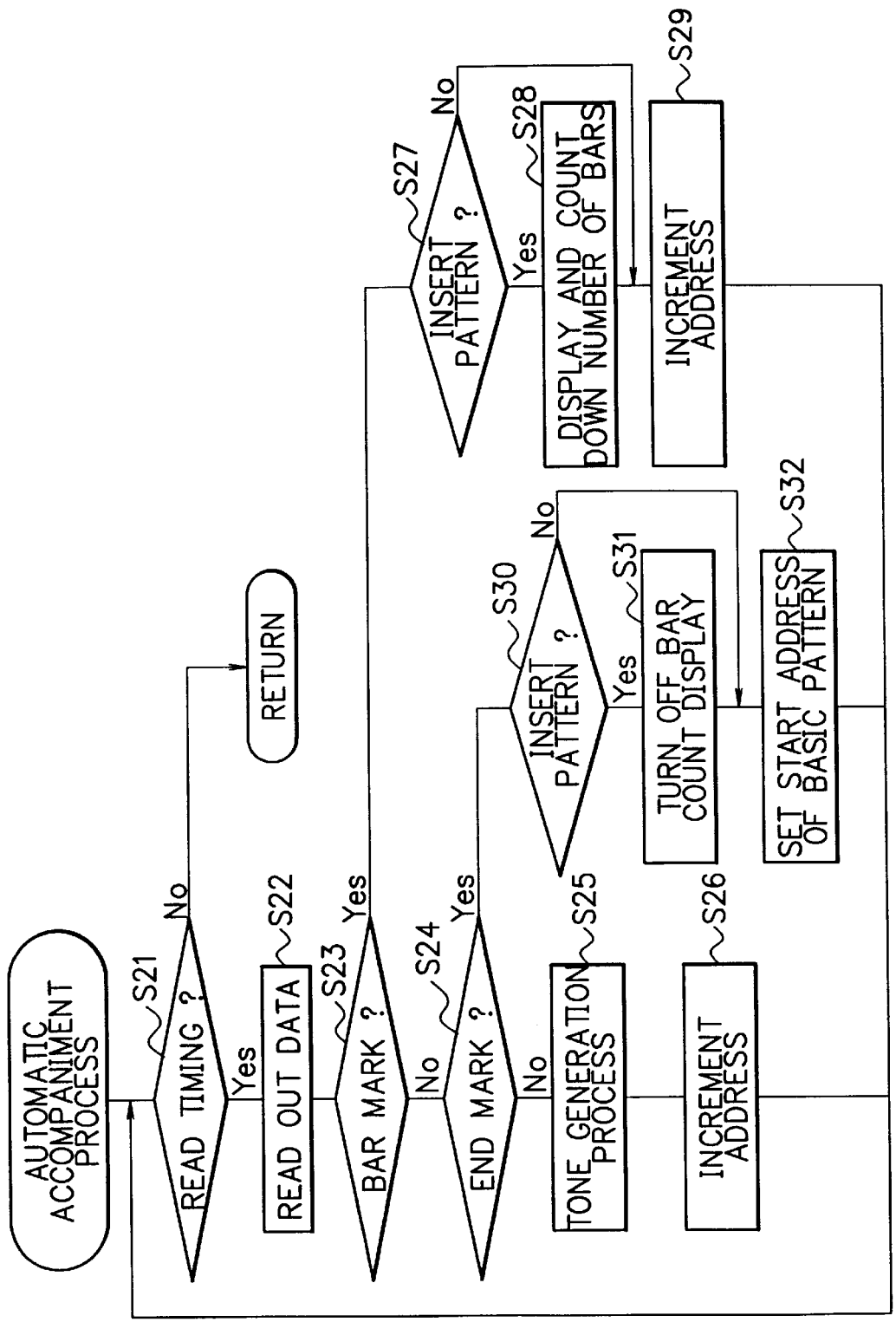

AUTOMATIC ACCOMPANIMENT APPARATUS DISPLAYING THE NUMBER OF BARS IN AN INSERT PATTERN

BACKGROUND OF THE INVENTION

1. Field of the Invention

The present invention relates to automatic accompaniment apparatus, particularly to automatic accompaniment apparatus having an automatic accompaniment function of various insert patterns such as an introduction pattern, a fill-in pattern, and an ending pattern, in addition to a basic pattern.

2. Description of the Related Art

Normally, an automatic accompaniment apparatus of an electronic musical instrument obtains accompaniment tones on the basis of accompaniment pattern data prepared in advance. Some conventional automatic accompaniment apparatus have a function capable of inserting various patterns such as an introduction pattern, a fill-in pattern, and an ending pattern, in addition to a basic pattern as accompaniment pattern data.

The introduction pattern is an accompaniment pattern for an introduction part which is played before the play of the basic pattern as a main theme of a music piece. When insertion of the introduction pattern is instructed, the play of the basic pattern is started after the introduction pattern is played. The fill-in pattern is an accompaniment pattern that fills a blank part or the like of a melody line. The ending pattern is an accompaniment pattern which is inserted at the end of a music piece. When insertion of the ending pattern is instructed, automatic accompaniment play is automatically stopped after completion of the play of the ending pattern.

In an electronic musical instrument which comprises an automatic accompaniment apparatus having various accompaniment patterns, the player often manually plays along with the automatic accompaniment tones. For example, when the basic pattern is about to start upon completion of the play of the introduction pattern or the fill-in pattern, the player may start a keyboard play, or may quit the keyboard play simultaneously with the end of the play of the ending pattern.

However, in the conventional automatic accompaniment apparatus, the introduction, fill-in, and ending insert patterns have different numbers of bars included in their accompaniment pattern data in units of rhythm styles such as waltz, rock, and tango. For this reason, when the player does not remember the numbers of bars of such patterns in units of rhythm styles, he or she cannot often determine the start/end timing of a manual play upon completion of the accompaniment pattern.

SUMMARY OF THE INVENTION

It is an object of the present invention to allow the player to make a smooth manual play along with automatic accompaniment tones of a given insert pattern even when he or she does not remember the number of bars of that insert pattern of a selected rhythm style.

An automatic accompaniment apparatus according to the present invention having a function of making an automatic accompaniment play of basic patterns and insert patterns prepared for each rhythm style, comprises instruction means for selecting a desired insert pattern and giving instructions to play the selected insert pattern, and display means for displaying the number of bars of the selected insert pattern in playing the selected insert pattern.

Preferably, the apparatus further comprises count-down means for counting down the displayed number of bars along with progress of the play of the selected insert pattern.

According to the present invention with the above arrangement, when a play of a desired insert pattern is instructed, since the number of bars of the selected insert pattern is displayed, the player can easily determine the end timing of that insert pattern and can easily enjoy a manual play along with the accompaniment tones even when he or she does not remember the numbers of bars of insert patterns, which are different in units of rhythm styles.

Also, according to another feature of the present invention, since the displayed number of bars is counted down along with progress of the play of the insert pattern, the degree of progress of the insert pattern and its end timing can be simply presented to the player.

BRIEF DESCRIPTION OF THE DRAWINGS

FIG. 7 is a flowchart showing an automatic accompaniment process executed by the automatic accompaniment apparatus according to the embodiment of the present invention.

DETAILED DESCRIPTION OF THE PREFERRED EMBODIMENTS

An embodiment of the present invention will be described hereinafter with reference to the accompanying drawings.

Figure 1:
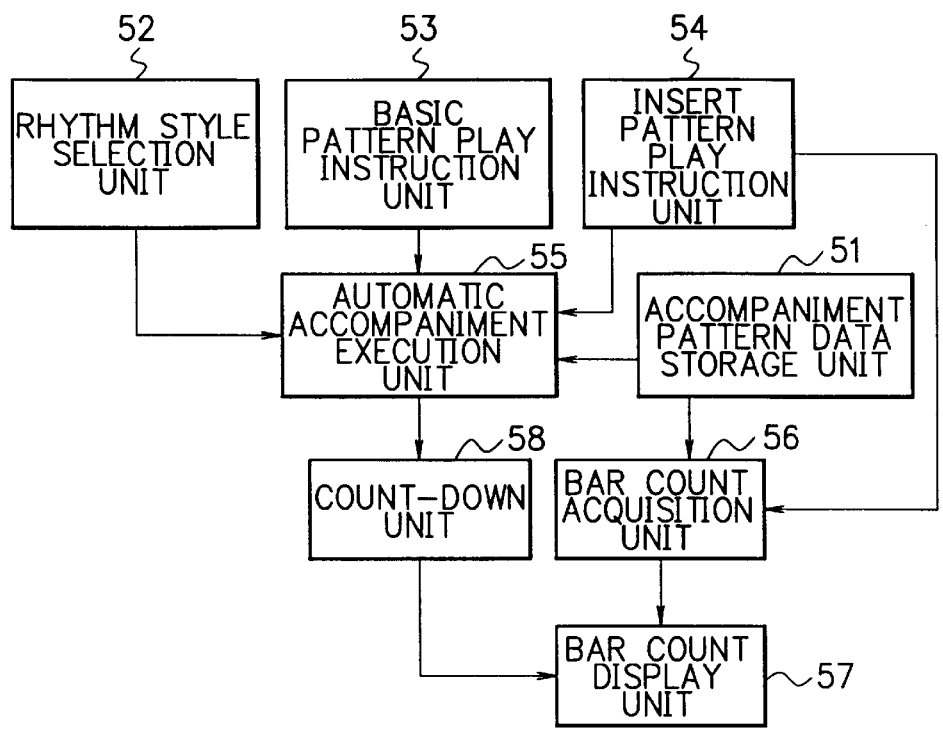
FIG. 1 is a block diagram showing a functional construction as an elementary feature of an automatic accompaniment apparatus according to the present invention.

FIG. 1 is a block diagram showing a functional construction as an elementary feature of an automatic accompaniment apparatus according to the present invention. Referring to FIG. 1, reference numeral 51 denotes a variation pattern data storage unit that stores several kinds of automatic accompaniment pattern data used upon automatic accompaniment as preset data. Sets of automatic accompaniment pattern data are stored in units of rhythm styles such as waltz, rock, and tango, in units of parts such as a drum part, bass part, and chord part, and in units of patterns such as a basic pattern, an introduction pattern, a fill-in pattern, and an ending pattern.

Reference numeral 52 denotes a rhythm style selection unit for selecting a desired one of rhythm styles prepared in advance as accompaniment pattern data. Reference numeral 53 denotes a basic pattern play instruction unit for selecting a desired basic pattern and instructing to play the selected pattern. Reference numeral 54 denotes an insert pattern play instruction unit for selecting a desired insert pattern such as an instruction pattern, a fill-in pattern, or an ending pattern, and instructing to play the selected pattern.

Reference numeral 55 denotes an automatic accompaniment execution unit for reading out accompaniment pattern data of the rhythm style, which is selected by the rhythm style selection unit 52, and corresponds to a pattern a play of which is instructed by the basic pattern play instruction unit 53 or the insert pattern play instruction unit 54, from the accompaniment pattern data storage unit 51, and executing automatic accompaniment on the basis of the readout data.

Reference numeral 56 denotes a bar count acquisition unit for acquiring the number of bars of a desired insert pattern which is selected and a play of which is instructed by the insert pattern play instruction unit 54 with reference to, e.g., the corresponding accompaniment pattern data. The number of bars included in accompaniment pattern data of an insert pattern differs in units of rhythm styles. However, since each accompaniment pattern data stores bar marks at the divisions of bars, the number of bars of the insert pattern corresponding to the selected rhythm style can be detected by counting the number of bar marks.

Table information that describes the numbers of bars in units of rhythm styles and insert patterns may be prepared in addition to accompaniment pattern data itself, and the number of bars of an insert pattern corresponding to the selected rhythm style may be detected with reference to this table information.

Reference numeral 57 denotes a bar count display unit for displaying the number of bars acquired by the bar count acquisition unit 56. Reference numeral 58 denotes a countdown unit for counting down the displayed number of bars along with progress of the play of the selected insert pattern when the automatic accompaniment execution unit 55 plays the selected insert pattern. This process can be implemented by counting down the displayed number of bars every time a bar mark is read upon executing automatic accompaniment while reading out corresponding accompaniment pattern data.

Figure 2:
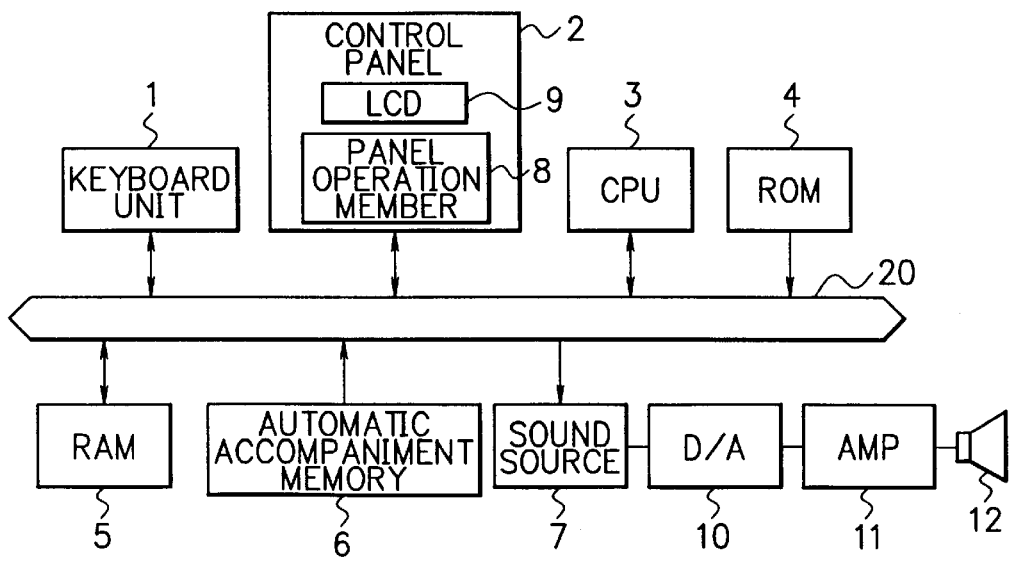
FIG. 2 is a block diagram showing an example of the overall arrangement of an electronic musical instrument including the automatic accompaniment apparatus according to the present invention.

FIG. 2 is a block diagram showing an example of the overall arrangement of an electronic musical instrument that includes the automatic accompaniment apparatus having the functions shown in FIG. 1.

In the electronic musical instrument of this embodiment, accompaniment tones of the basic pattern or the insert pattern such as an introduction pattern, a fill-in pattern, or an ending pattern, are produced by a microcomputer.

Referring to FIG. 2, a keyboard unit 1, a control panel 2, a CPU 3, a ROM 4, a RAM 5, an automatic accompaniment memory 6, and a sound source 7 are connected to a bus line 20 including a data bus, an address bus, and the like, and can exchange data with each other.

The keyboard 1 comprises one or more keyboards each including keys and key switches provided in accordance with those keys. Each key switch can detect ON and OFF key events, and can also detect the operation speed of the corresponding key. In a multi-keyboard instrument (e.g., an electronic organ) having keyboards, one of keyboards is used to designate chord progression of an automatic accompaniment. On the other hand, in a single-keyboard instrument (e.g., a keyboard), some keys of the keyboard are used to designate chord progression of an automatic accompaniment.

The control panel 2 has panel operation members 8, and a liquid crystal display (LCD) 9. The panel operation members 8 include operation members for setting various parameters required upon automatic accompaniment based on accompaniment pattern data, which are preset or set by the user, in addition to operation members for setting various kinds of tone parameter information (tone color, tone volume, effect, etc.) required for the user to play. The LCD 9 displays the setup states and the like of these operation members, the number of bars of the selected insert pattern, and the like. Therefore, the LCD 9 corresponds to the bar count display unit 57 shown in FIG. 1.

The operation members used upon automatic accompaniment include an operation member for selecting a rhythm style such as a waltz, rock, or tango, an operation member for selecting a desired one of variation patterns prepared as automatic accompaniment data of the basic pattern, an operation member for selecting various insert patterns such as an introduction pattern, a fill-in pattern, and an ending pattern, and instructing to play the selected pattern, and the like, in addition to an operation member for instructing to start/stop automatic accompaniment. Therefore, the panel operation members 8 include the rhythm style selection unit 52, the basic pattern play instruction unit 53, and the insert pattern play instruction unit 54 shown in FIG. 1.

The CPU 3 scans the respective key switches of the keyboard unit 1 and the panel operation members 8 on the control panel 2 to detect the operation states (ON or OFF key events, key numbers of ON keys, velocities associated with the operation speeds (magnitudes to tones to be produced) of ON keys, etc.) of the respective keys on the keyboard unit 1, and those of the panel operation members 8 on the control panel 2, and executes the following processes in accordance with the operations of the keys and operation members, in accordance with programs stored in the ROM 4.

For example, the CPU 3 obtains accompaniment tone data to be produced on the basis of chord information detected based on key operations on the keyboard unit 1, while reading out automatic accompaniment pattern data corresponding to a variation pattern or an insert pattern selected by the operation members on the control panel 2 from the automatic accompaniment memory 6. The CPU 3 then supplies the obtained accompaniment tone data to the sound source 7 to form and output the corresponding accompaniment tone signals.

Also, the CPU 3 executes a process for acquiring and displaying the number of bars of the selected insert pattern upon instruction of a play based on the insert pattern, and a process for counting down the displayed number of bars along with progress of the play of the selected insert pattern. Therefore, the CPU 3 includes the bar count acquisition unit 56 and count-down unit 58 shown in FIG. 1. These processes will be described later in detail.

The automatic accompaniment memory 6 stores several kinds of automatic accompaniment pattern data used upon automatic accompaniment as preset data. Sets of automatic accompaniment pattern data are stored in units of rhythm styles such as waltz, rock, and tango, and in units of patterns such as a basic pattern, an introduction pattern, a fill-in pattern, and an ending pattern. The basic pattern further includes variation patterns.

Figure 3:
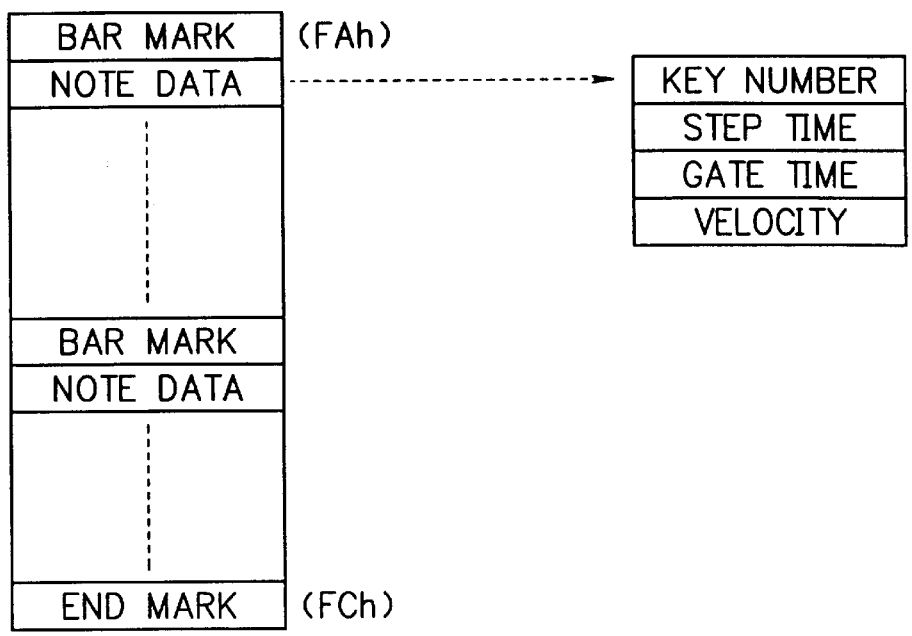
FIG. 3 is a chart showing the format of automatic accompaniment data.

Each automatic accompaniment pattern data includes bar marks each indicating the head of a given bar, note data as note information of notes to be produced, and an end mark indicating the end of accompaniment pattern data, as shown in FIG. 3. Each note data consists of a key number for specifying the type of key, a step time indicating a tone generation timing, a gate time indicating a tone generation duration, and a velocity indicating an ON key speed. When the automatic accompaniment pattern data is read out in turn from the first bar mark and the end mark is reached, it returns to the first bar mark again to continue automatic accompaniment.

The ROM 4 stores various required data in addition to programs that store various processing sequences of the CPU 3, and waveform data based on which tone signals are generated. Note that the ROM 4 and automatic accompaniment memory 6 are individually provided, but the ROM 4 may store various automatic accompaniment pattern data.

The RAM 5 has storage areas for temporarily storing various kinds of information during execution of various processes by the CPU 3, and storing information obtained as a result of various processes. For example, the RAM 5 has storage areas for storing information such as various states (the selected rhythm style, accompaniment pattern, etc.) set upon operation of the panel operation members 8, the number of bars of the insert pattern, and the like.

The sound source 7 corresponds to the automatic accompaniment execution unit 55 shown in FIG. 1, and comprises n tone generation channels to be able to produce tones at the same time. In this manner, not only automatic accompaniment tones of drum, bass, and chord parts can be simultaneously produced, but also these automatic accompaniment tones and tones played by the player upon operating the keyboard 1 can be simultaneously produced.

The sound source 7 generates a tone signal on the basis of note data sent from the CPU 3, tone parameter information set upon operation of the panel operation members 8, and the like. More specifically, the sound source 7 generates a waveform read address on the basis of key number information in the note data, and reads out tone waveform data from the ROM 4 in accordance with the generated address. The sound source 7 then processes the readout tone waveform data using envelope information, and outputs the processed result to a D/A converter 10. A tone signal output from the D/A converter 10 is amplified by an amplifier 11, and is supplied to a loudspeaker 12.

Figure 4:
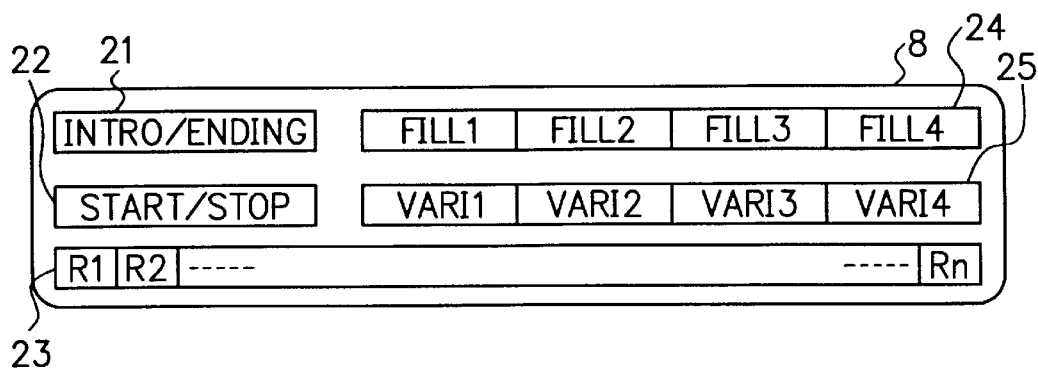
FIG. 4 is a diagrammatic view showing part of a specific construction of the control panel shown in FIG. 2.

FIG. 4 is a diagrammatic view showing part of a specific construction of the above control panel 2. FIG. 4 does not illustrate operation members for setting various kinds of tone parameter information (tone color, tone volume, effect, etc.), and illustrates only an operation member group used upon automatic accompaniment. The automatic accompaniment operation member group includes an introduction/ending switch 21, a start/stop switch 22, rhythm select switches 23, fill-in switches 24, and variation switches 25.

The introduction/ending switch 21 is an operation member used to instruct play of an introduction or ending pattern, and serves as one building component of the insert pattern play instruction unit 54 shown in FIG. 1. Upon operation of this switch at the beginning of automatic accompaniment, an introduction pattern is played, and the variation pattern selected upon operation of one of the variation switches 25 starts. Upon operation of this introduction/ending switch 21 in the middle of a play, the play automatically stops after accompaniment tones of the ending pattern are produced.

The rhythm select switches 23 are used to select a desired one of n rhythm styles R1 to Rn prepared in advance as automatic accompaniment pattern data, and correspond to the rhythm style selection unit 52 shown in FIG. 1.

The variation switches 25 are operation members used to select a desired one of variation patterns (four patterns VARI1 to VARI4 in the example shown in FIG. 4) prepared in advance as automatic accompaniment data of the basic pattern. More specifically, the basic pattern includes variation patterns to improve the power of expression of a play, and an arbitrary one of these patterns can be selected using the variation switches 25.

The start/stop switch 22 is an operation member used to instruct to start/stop automatic accompaniment. When the start/stop switch 22 is operated while a desired variation pattern is selected by one of the variation switches 25, an automatic accompaniment play of the selected variation pattern is started. On the other hand, when the start/stop switch 22 is operated during the play, the automatic accompaniment play is stopped. Therefore, the variation switches 25 and the start/stop switch 22 correspond to the basic pattern play instruction unit 53 shown in FIG. 1.

The fill-in switches 24 are operation members used to select a desired one of fill-in patterns (fill-in patterns FILL1 to FILL4 that respectively match the four variation patterns VARI1 to VARI4 in the example shown in FIG. 4) prepared in advance, and instruct to play the selected pattern. The fill-in switches 24 serve as some building components of the insert pattern play instruction unit 54 shown in FIG. 1. More specifically, those having identical numbers of the patterns VARI1 to VARI4 and FILL1 to FILL4 correspond to each other.

Figure 5:
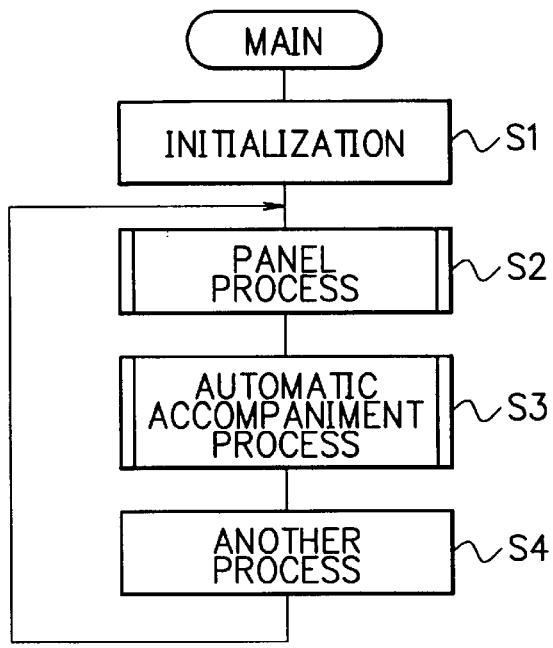
FIG. 5 is a flowchart showing a main routine executed by the automatic accompaniment apparatus according to an embodiment of the present invention.
Figure 6:
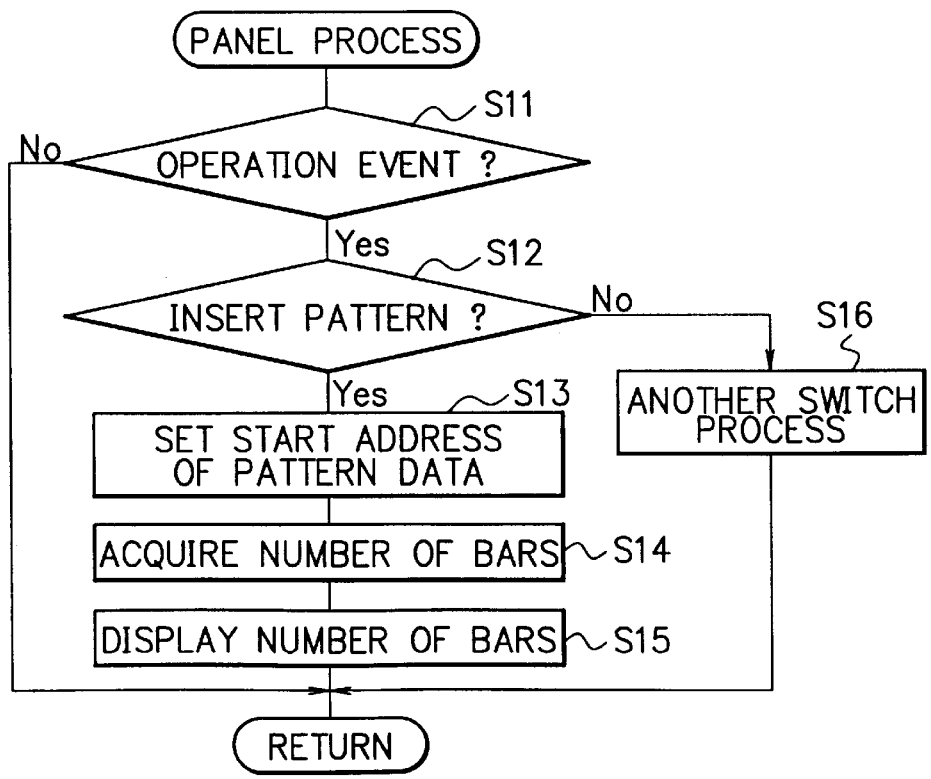
FIG. 6 is a flowchart showing a panel process executed by the automatic accompaniment apparatus according to the embodiment of the present invention.

FIGS. 5 to 7 are flowcharts showing operations of the automatic accompaniment apparatus according to this embodiment with the above arrangement. FIG. 5 is a flowchart showing the operation of a main routine. Referring to FIG. 5, the CPU 3 shown in FIG. 2 initializes in step S1. In this case, the CPU 3 clears the storage areas of the RAM 5, the tone generation channel assignments in the sound source 7, etc.

Upon completion of initialization, the CPU 3 executes a panel process in step S2, and an automatic accompaniment process in step S3 in turn, and then executes another process in step S4. The flow then returns to step S2, and the CPU 3 repeats a similar loop process until the power switch of the automatic accompaniment apparatus is turned off.

In the panel process in step S2, the CPU 3 detects an operation event of the panel operation members 8 on the control panel 2, and executes a corresponding process. More specifically, the CPU 3 executes processes shown in the flowchart of FIG. 6. Referring to FIG. 6, the CPU 3 shown in FIG. 2 scans various operation members equipped on the control panel 2 to detect the presence/absence of an operation event of each operation member in step S11. If no operation event is detected, the control leaves this panel process.

On the other hand, if some operation event has taken place, the flow advances to step S12 to check if that event is an operation event of the insert pattern play instruction unit 54 (the introduction/ending switch 21 or one of the fill-in switches 24). If a play of a given insert pattern is instructed, the flow advances to step S13, and the start address of automatic accompaniment data of the currently selected variation pattern of the insert pattern selected at that time is set in the RAM 5 or a register (not shown) or the like in the CPU 3.

In step S14, the number of bars included in the selected insert pattern is acquired by counting the number of bar marks with reference to automatic accompaniment pattern data of the selected insert pattern from its head to end. In step S15, the acquired number of bars is displayed on the LCD 9, and the control exits this panel process. If the detected operation event is not an insert pattern play instruction event, the flow advances from step S12 to step S16 to execute another switch process corresponding to that operation event, and the control exits this panel process.

The automatic accompaniment process in step S3 in FIG. 5 produces accompaniment tones on the basis of various automatic accompaniment pattern data stored in the automatic accompaniment memory 6. More specifically, processes shown in the flowchart of FIG. 7 are done. Referring to FIG. 7, the CPU 3 in FIG. 2 checks in step S21 if the read timing of automatic accompaniment data has been reached. The read timing is appropriately controlled on the basis of the pattern, the rhythm style, the set tempo, etc., of the selected automatic accompaniment data.

If the data read timing has not been reached yet, the control exits the automatic accompaniment process; otherwise, the flow advances to step S22 to read out automatic accompaniment data indicated by the address currently set in the RAM 5 or a register (not shown) or the like in the CPU 3 from the automatic accompaniment memory 6. The CPU 3 then checks in steps S23 and S24 if the readout data is a bar mark or an end mark.

If the readout data is neither a bar mark nor an end mark, since the readout data is note data, the flow advances to step S25 to execute a tone generation process based on that note data. The read address of accompaniment pattern data is incremented by "1" in step S26, and the flow returns to step S21.

If it is determined in step S23 that a bar mark is read out, the flow advances to step S27 to check with reference to the RAM 5 if the currently selected automatic accompaniment pattern is an insert pattern. If an insert pattern is selected in place of a basic pattern, the number of bars displayed on the LCD 9 is decremented by "1" in step S28, and the read address is incremented by "1" in step S29. The flow then returns to step S21. On the other hand, if a basic pattern is currently selected, the flow skips the process in step S28.

On the other hand, if it is determined in step S24 that an end mark is read out, the flow advances to step S30 to check with reference to the RAM 5 if the currently selected automatic accompaniment pattern is an insert pattern. If the currently selected pattern is an insert pattern, the bar count display on the LCD 9 is turned off in step S31. In order to restart a play from the beginning of the basic pattern, the start address of automatic accompaniment data of the basic pattern is set in the RAM 5 or a register (not shown) or the like in the CPU 3 in step S32, and the flow returns to step S21.

As described above in detail, according to this embodiment, when a play of a desired insert pattern is instructed, the number of bars of the selected insert pattern is acquired and displayed. For this reason, even when the player does not remember the numbers of bars of insert patterns, which are different in units of rhythm styles, since the number of bars of the selected insert pattern is displayed on the LCD 9 upon starting the play of that insert pattern, the player can determine the end timing of the insert pattern, and can easily enjoy a manual play along with that pattern.

Also, in this embodiment, since the displayed number of bars is counted down along with progress of the play of the insert pattern, the degree of progress of the insert pattern and its end timing can be simply presented to the player. In this way, according to this embodiment, the player who plays using rhythm styles need not remember the numbers of bars of insert patterns in units of rhythm styles, resulting in convenience upon play.

In the above embodiment, the number of bars of an insert pattern is numerically displayed. However, the present invention is not limited to such specific display pattern. For example, at the beginning of the play of a given insert pattern, an indicator or the like having a length corresponding to the number of bars of that insert pattern is displayed, may be shortened as the number of bars decreases, and may be turned off upon completion of the play of the insert pattern.

What is claimed is:

1. An automatic accompaniment apparatus having a function of making automatic accompaniment play of basic patterns and insert patterns prepared for each rhythm style, comprising:
   instruction means for selecting a desired insert pattern and giving instructions to play the selected insert pattern; and
   display means for displaying the number of remaining bars of said selected insert pattern in playing said selected insert pattern.

2. An apparatus according to claim 1, further comprising count-down means for counting down the displayed number of bars along with progress of the play of said selected insert pattern.

3. The apparatus according to claim 2 wherein the displayed number of bars is a number of bars that remain in said selected insert pattern during play of said selected insert pattern.

4. The apparatus according to claim 1 further comprising a control unit playing said selected insert pattern before playing a basic pattern.

5. The apparatus according to claim 1 further comprising a control unit playing said selected insert pattern after playing a basic pattern.

6. The apparatus according to claim 1 further comprising a control unit playing said selected insert pattern before and after playing a basic pattern.

7. The apparatus according to claim 3 further comprising a control unit playing said selected insert pattern before playing a basic pattern.

8. The apparatus according to claim 3 further comprising a control unit playing said selected insert pattern after playing a basic pattern.

9. The apparatus according to claim 3 further comprising a control unit playing said selected insert pattern before and after playing a basic pattern.

10. The apparatus according to claim 1 wherein the display means displays the number of bars of said selected insert pattern when the instruction means gives instruction to play the selected insert pattern and prevents display of the number of bars when a basic pattern is being played.

11. The apparatus according to claim 7 wherein the display means displays the number of bars of said selected insert pattern when the instruction means gives instruction to play the selected insert pattern and prevents display of the number of bars when the basic pattern is being played.

12. The apparatus according to claim 8 wherein the display means displays the number of bars of said selected insert pattern when the instruction means gives instruction to play the selected insert pattern and prevents display of the number of bars when the basic pattern is being played.

13. The apparatus according to claim 9 wherein the display means displays the number of bars of said selected insert pattern when the instruction means gives instruction to play the selected insert pattern and prevents display of the number of bars when the basic pattern is being played.

14. An automatic accompaniment apparatus comprising:
   instruction unit selecting an insert pattern and generating instructions to request playing the selected insert pattern;
   control unit configured to play the selected insert pattern and a basic pattern; and
   display unit displaying the number of remaining bars of the selected insert pattern when the control unit starts playing the selected insert pattern and up to the control unit starting to play the basic pattern.

15. The apparatus according to claim 14, further comprising count-down unit counting down the displayed number of bars along with progress of the control unit playing the selected insert pattern and up to the control unit starting to play the basic pattern.

* * * * *